Jan. 29, 1929.
R. M. SEARLE
1,700,142
MANHOLE DRIER AND VENTILATOR
Filed Jan. 10, 1927
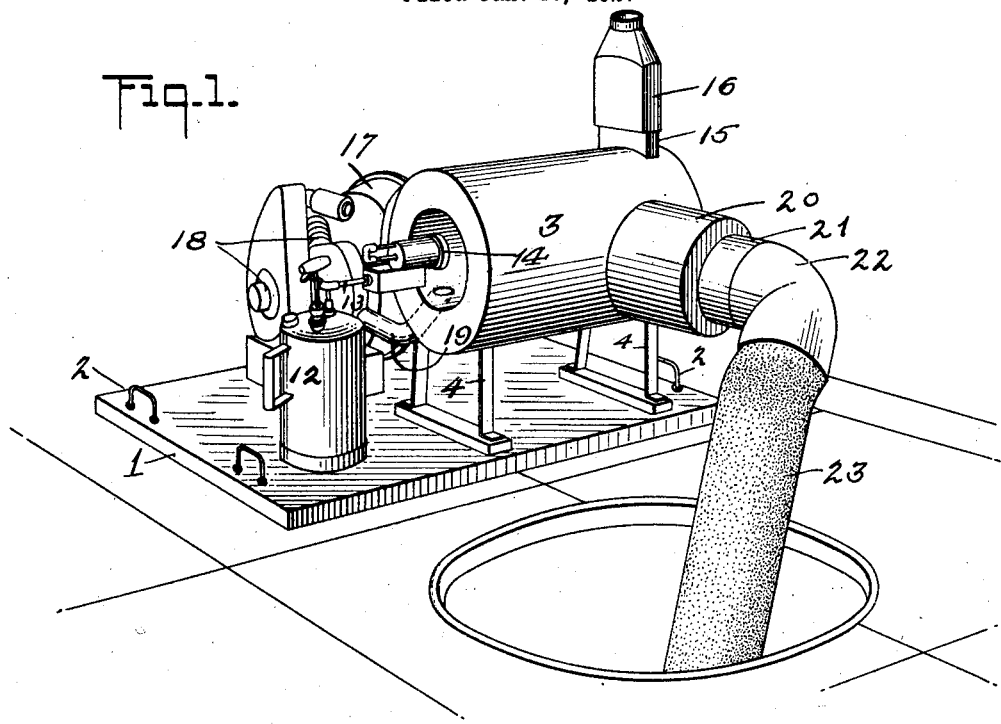
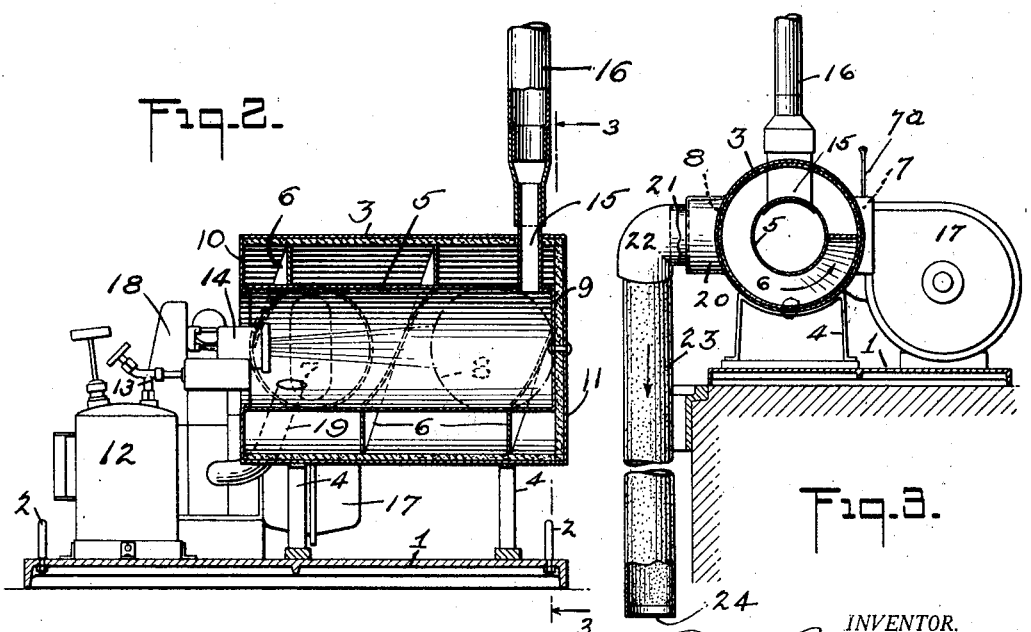
INVENTOR.
Robert M. Searle
BY
J. Willard Rich
His ATTORNEY.

Patented Jan. 29, 1929.

1,700,142

UNITED STATES PATENT OFFICE.

ROBERT M. SEARLE, OF ROCHESTER, NEW YORK, ASSIGNOR TO ROCHESTER GAS AND ELECTRIC COMPANY, OF ROCHESTER, NEW YORK, A CORPORATION OF NEW YORK.

MANHOLE DRIER AND VENTILATOR.

Application filed January 10, 1927. Serial No. 160,055.

My present invention has for its object to provide an apparatus for ventilating manholes, and particularly one that is portable and adapted for the use of employees of public service corporations, such as gas and electric companies.

The apparatus embodying my invention is designed to heat atmospheric air and deliver it under suitable pressure, to the interior of an underground chamber, familiarly termed a manhole and which may be placed in proximity thereto on the street level.

The specific objects attained by this invention are, the heating of the interior of the manhole so that workmen may perform their duties in comfort, the provision of continuous changes of heated air in the manhole so as to discharge therefrom vitiated air and obnoxious gases, the introduction of fresh air, and the removal of excessive moisture from a manhole by the use of heated air.

In the accompanying drawings there is shown a preferred embodiment of the invention, but it is understood that the invention is not limited to the specific form illustrated, since it will readily occur to those skilled in the art that various modifications and arrangements of the apparatus may be made without departing from the principles of the invention.

Fig. 1 is a perspective view of an apparatus embodying my invention in operative position;

Fig. 2 is a longitudinal cross-section taken through the center of the heating drum, other parts being shown in elevation, and Fig. 3 is an end view, partly in section on the line 3—3 of Fig. 2.

Throughout said drawings like reference numerals indicate like parts.

In carrying out my invention I provide a heating chamber through which air is circulated by means of a continuously operated blower, and from which it is conveyed through a conduit to a suitable point of discharge in a manhole. The conduit is preferably flexible and its discharge end normally reaches to the bottom of the chamber or cavity to be ventilated. The heating chamber is made with spaced walls the inner one of which is open at one end, and in alinement therewith is a hydrocarbon fuel burner which discharges burning products of combustion into the central compartment of the heater, said burner being supplied with fuel under pressure from a suitable container.

The elements above mentioned are all mounted upon a support or platform on which they are compactly disposed enabling the apparatus as a whole to be readily transported and quickly located and put into operation at a desired point.

In illustrating my invention, I have shown the supporting element or platform as a rectangular base 1, preferably a metal casting having at its ends suitable handles 2 by means of which it may be easily transported or adjusted at a given location. Above the base 1 and at one side thereof is the heating chamber 3 supported on legs 4. This chamber is cylindrical and comprises outer and inner walls. The inner wall 5 is spaced circumferentially from the outer wall to provide a surrounding air passage which is given a tortuous shape by providing baffles between the walls such as the spirally formed rib 6 which directs the air currents from the inlet port 7 in the outer wall at one end of the chamber to the outlet port 8 at the opposite end and cause the air to circulate in contact with the surface of the inner wall. The heating chamber within the inner wall (5) is open at one end and closed at the other by a head (9) and the space between the two walls which provides the passage for heated air, is closed at the forward end of the chamber by the annular head (10) and at the rear end by the head (11) which completely closes that end of the outer wall and which is spaced from the head (9) to allow for an inner lining of a refractory material.

The platform is made somewhat longer than the chamber 3 and in front of it is secured a tank, or receptacle 12, for hydrocarbon fuel under pressure which is fed by a pipe 13 to a burner 14. The latter is located in axial alinement with the area bounded by the inner wall 5 and is adapted to discharge the burning products of combustion therein. Rising from the inner end of the retort is a flue 15 which extends through the outer wall of the chamber and is adapted to receive and support a removable stack 16 of any desired height.

Mounted on the platform at one side of the heater is a continuously operated motor driven blower 17, the outlet of which is connected to the inlet 7, the flow of the air there-through being regulated by an adjustable damper 7ª (Fig. 3). The blower is preferably constructed integrally with a hydrocarbon engine 18 as this arrangement results in an economy of space with a minimum weight of parts. A gas engine is also a desirous form of power as the exhaust products of combustion emitted from its cylinder are discharged into the heating chamber, as by an exhaust pipe 19, which will in many cases provide sufficient heat and obviate the necessity of using the products of combustion supplied by the burner 14.

The outlet port of the air chamber 3 is provided with a laterally extending collar 20 which projects slightly beyond the edge of the platform 1 and has a reduced collar 21 carrying a rotatably and angularly adjustable elbow 22 to which the air conduit 23 is attached. The latter is preferably flexible and may be conveniently made of canvas. If desired the outer extremity of the conduit may be covered with netting 24 which will prevent the possibility of igniting gas which may have accumulated in an underground chamber in case of carelessness in the operation of the apparatus before sufficient ventilation of such a cavity has been effected.

In the practical use of an apparatus of this character I have determined that a blower which will deliver from 1000 to 1250 cubic feet of air per minute will change the air in the larger manholes (6' x 11' x 8') twice a minute. The air chamber is made of sufficient size to provide an interior heating chamber sufficient to enable any desired maximum degree of temperature to be obtained which can be regulated by the quantity of fuel discharged by the burner.

An output such as described has been built to occupy a space approximately 3' x 4' x 2½' with a weight of about 250 pounds and in practice I have found that it will not only adequately ventilate a manhole of the dimensions before given but will dry the walls thereof at a comparatively rapid rate depending upon the rate of fuel consumption, speed of the blower and other variable factors.

I claim as my invention:

A manhole ventilating and drying unit comprising a portable platform, an air circulating chamber comprising spaced outer and inner walls of equal length horizontally mounted on the platform, the space within the inner wall being open at one end and affording a heating chamber, a fuel burner mounted in open air on the platform at a distance away from said walls and horizonally discharging burning products of combustion within said chamber through the open end of the inner wall, an air blower also carried by the platform at one side of the outer wall and connected to an inlet port through the outer wall and an air outlet conduit leading from an outlet port formed an the other side of the outer wall.

This specification signed this 30th day of December, 1926.

ROBERT M. SEARLE.